April 8, 1930.  A. B. FOWLER  1,753,855
CUTTER HEAD
Filed April 10, 1925
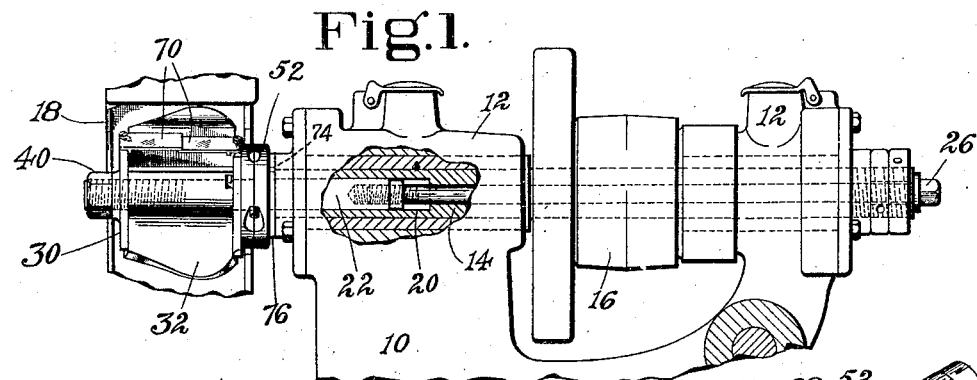
Fig.1.
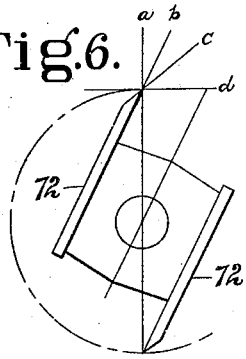
Fig.6.
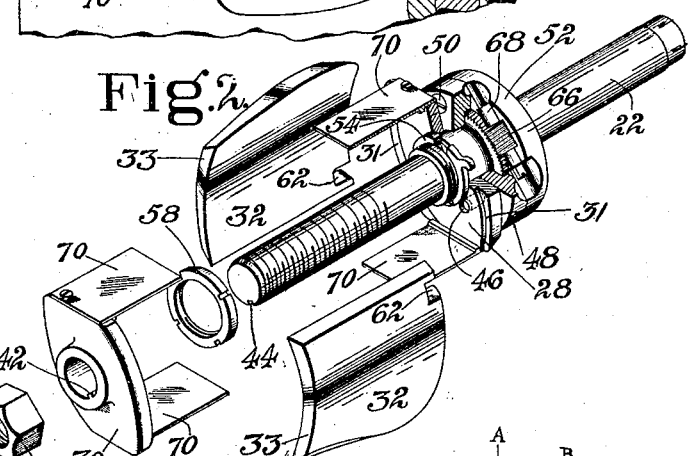
Fig.2.
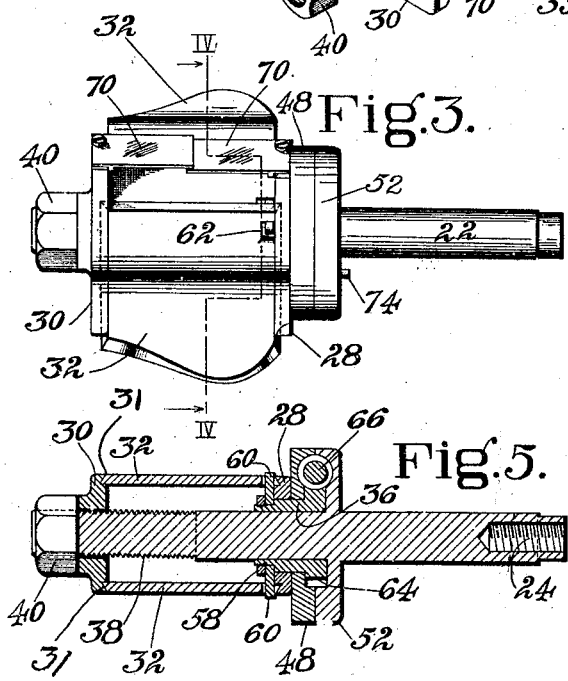
Fig.3.
Fig.5.
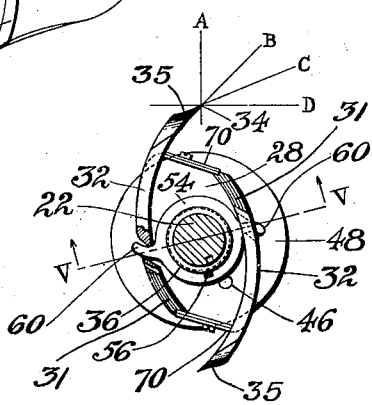
Fig.4.
INVENTOR
Alfred B. Fowler
By his Attorney,
Nelson W. Howard Patented Apr. 8, 1930

1,753,855

UNITED STATES PATENT OFFICE

ALFRED B. FOWLER, OF BEVERLY, MASSACHUSETTS, ASSIGNOR TO UNITED SHOE MACHINERY CORPORATION, OF PATERSON, NEW JERSEY, A CORPORATION OF NEW JERSEY

CUTTER HEAD

Application filed April 10, 1925. Serial No. 22,143.

This invention relates to rotary cutter-heads, and more especially to those of heel-trimming machines such, for example, as that disclosed in Letters Patent No. 961,752, granted June 21, 1910, in the name of J. N. Busell, machines of this type being used to shape the peripheries, or in some cases the breasts, of heels.

One type of rotary cutter-head heretofore commonly employed in heel-trimming machines is provided with flat knives which are disposed in parallel relation at opposite sides of the cutter-head, and which have their cutting edges formed at the inner surfaces of the knife blades. The formation of the cutting edges of such knives at the inner surfaces of the knife blades has the advantage that the blades may be sharpened by grinding their outer faces, thus making it entirely practicable to sharpen them without removal from the cutter-head. In operation, however, knives of this type work at angles so abrupt relatively to the shoe heels upon which they are designed to operate that they have a scraping action, rather than a true cutting or shaving action such as is desirable to insure clean, smooth cutting, and thus to produce the best results from the trimming operation. In view of this, there have been widely used rotary cutter-heads having knife blades curved longitudinally, that is, from their cutting edges to their rear edges. As heretofore constructed the curved blades of such cutter-heads have been substantially concentric therewith, their centers of curvature being offset from the axis of the cutter-head only slightly, just sufficiently so that the outer convex faces of the blades back of the cutting edges will clear the work. These cutter-heads have the advantage that their longitudinally curved blades execute a true cutting action. On the other hand, it is not practicable to form the cutting edges of longitudinally curved blades of cutter-heads so organized on the inner surfaces of the knife blades, because if the cutting edges were formed on their inner surfaces, the cutting edges would be prevented from entering the work by the thickness of the blades. Inasmuch as blades having their cutting edges formed at their outer faces have to be sharpened by grinding their inner faces it has been necessary, in order to sharpen the blades of cutter-heads having longitudinally curved blades disposed as heretofore, to remove the blades from the cutter-heads before they could be sharpened, since the inner faces of such blades are not conveniently assessible while the blades are in the cutter-head. It is undersirable to remove the blades for grinding on account of the time required both for removing and replacing them and the necessity of careful adjustment of the knives after replacement to insure that their sharpened edges will be located equi-distant from the axis of the cutter-head so that they will have the same action upon the work. Furthermore, the above-mentioned disadvantage of having to remove the blades for grinding cannot be overcome merely by forming the cutting edges at the inner surfaces of the blades since if this were done the beveled faces of the blades would project beyond the cutting edges and prevent the latter from engaging the work.

With the foregoing in mind, one object of the present invention is to provide an improved rotary cutter-head, adapted for trimming heels, which will have an easy cutting action and otherwise have all the advantages of rotary cutters having longitudinally curved blades such as those referred to, and which, at the same time, will be so organized that its blades may be conveniently sharpened without requiring their removal from the cutter-head.

To the accomplishment of this object, and in accordance with one feature of this invention, the illustrated cutter-head is provided with a plurality of longitudinally curved knife blades having their cutting edges formed at their inner faces, the blades being symmetrically arranged at opposite sides of the cutter-head and disposed in such eccentric relation to the cutter-head as to insure proper engagement of the cutting edges with the work and also to provide for presentation of the blades in such a manner as to insure an easy and effective cutting or shaving action, as distinguished from a scraping action. Inasmuch as the cutting edges are formed at the inner surfaces of the blades by grinding the outer surfaces with the periphery of a grinding wheel, they are each formed at the intersection of two faces each concaved in sections in planes perpendicular to the axis of the inner or cutting face, and may be very acute without unduly weakening the blades. As illustrated, two blades are arranged diametrically opposite each other with respect to the axis of the cutter-head, the radius of curvature of each blade is substantially equal to the cutting radius and the centers of curvature of the blades are located in the same axial plane and each is offset from the cutter-head axis a distance approximately equal to the radius of the cutter head. As a further advantage of such a construction and arrangement of knife blades as that above described, there are provided knife blades which are of greater length before grinding and which have consequently a longer effective life than any blades heretofore employed in rotary cutters of this type. Moreover, an organization such as above described not only makes it practicable to sharpen the blades without removal from the cutter-head but lends itself to presentation of the cutter-head with its blades as a unit for grinding the cutting edges of the blades by the use of a grinding machine such, for example, as that set forth in my copending application Serial No. 22,144 filed April 10, 1925.

Further to facilitate presentation of the cutter-head with its blades as a unit to a grinding machine such as that just referred to, there is provided improved means for adjusting the blades in the cutter-head to shift the cutting edges toward and from the axis of rotation so that all the blades shall have exactly the same cutting action and so that they may be ground to a desired radius of curvature. A novel feature relating to this aspect of the invention consists in blades each having a notch in one of its side edges, and a cutter-head provided with a rotary adjusting member having fingers formed and arranged to occupy the aforesaid notches, to adjust the blades collectively and to hold them so that one will not move more or less than the other or others.

Another novel feature relating to the blade-adjusting means consists in a cutter-head formed to provide a closed, dust-proof chamber to enclose suitable reducing gearing by which the rotary adjusting member is operated, the prime mover of the reducing gearing having a shank or stem projecting through a bearing to the exterior so that an operating tool may be applied to it to turn it. By means of this gearing a very fine adjustment of the amount of projection of blades from the cutter-head may be effected, so that it is practicable to advance the blades a predetermined minimum amount and by setting the grinding machine of the herein-mentioned copending application to grind away a corresponding amount, a considerable saving of knife material may be effected.

A still further feature consists in a cutter-head having means, or, at least, an essential element of means for registering each of the blades, in turn, relatively to the abrading element of a sharpening apparatus or grinding machine such as that hereinbefore referred to, so that the blades will be sharpened uniformly and have equal length of radius when sharpened. Preferably, the registering means above mentioned may be utilized also to form an interlocking connection between the cutter-head and the shaft by which it is carried to perform its trimming work.

The invention also comprises a novel feature for controlling the dust and chips produced by the cutters, the object of which is to direct said dust and chips into an adjacent dust-hood instead of permitting them to pass through the cutter-head only to be thrown broadcast. This feature comprises guards formed in complemental sections and carried by the blade-clamping members of the cutter-head. Each guard, being formed in two sections which are fastened respectively to the blade-clamping members and lap each other more or less between the latter, is thus adjustable in width and its effective width is determined in every case by the width of the blades placed in the cutter-head.

It should be understood that in various aspects the invention is not limited to embodiment in a two-blade type of rotary cutter or to use in a cutter having blades designed for heel trimming but may be advantageously embodied in other types of cutters adapted for similar purposes.

Other novel features of the invention are hereinafter described and claimed, and are illustrated by the drawings.

In the drawings,

Fig. 1 is a front elevation, partly in section, of a portion of a heel-trimming machine equipped with a cutterhead embodying this invention;

Fig. 2 is an "exploded" perspective view of the cutterhead, a portion thereof being broken out to show interior features;

Fig. 3 is a front elevation of the cutter-head fully assembled and ready to be installed in a heel-trimming machine for use, or in a grinding machine to sharpen the blades;

Fig. 4 is a cross-section indicated by line IV—IV on Fig. 3;

Fig. 5 is a longitudinal section of the cutter-head taken on the line V—V in Fig. 4; and Fig. 6, which is for purposes of comparison, shows a well-known type of cutter-head having flat blades.

Fig. 1 includes a portion of the frame 10 of a heel-trimming machine, separate bearings 12 being provided therein for a rotary holder consisting of a hollow shaft 14 having a pulley 16. This figure also includes the receiving portion 18 of a suction dust-removing apparatus by which the dust and chips produced by the cutter-head are transmitted through a conduit to a remote point of discharge. The general organization of the illustrated machine is similar to that more fully shown, for example, in Patent No. 961,-752, hereinbefore referred to, and includes the usual heel-rest, toplift guard and counter guard. The pulley shaft 14 is formed with a counterbore 20 at its left-hand end to receive the cylindric shank or stem 22 of a detachable cutter-head. An internally threaded socket 24 is formed in the shank 22 (Fig. 5) to receive one end of a bolt 26 arranged in the pulley shaft to fasten the cutter-head thereto. The head of this bolt is accessible at the right-hand end of the shaft.

The cutter-head comprises, in addition to the shank 22, co-operative disks or plates 28 and 30 for clamping a pair of cutter blades 32 by their side edges. As shown best in Fig. 5, the blades are straight in cross-section and their side edges 33 are beveled to fit in correspondingly formed eccentric curved grooves 31 in the clamping disks. As shown by Fig. 4, the cutter blades are curved lengthwise, that is, from their cutting edges 34 toward their rear edges. The curvature of the blades is of uniform radius to provide for adjusting the blades ahead as they grow shorter in consequence of being sharpened.

As shown by Figs. 2 and 5, a sleeve 36 is bored to fit and arranged to turn on a smooth cylindric portion of the shank 22 and extends through the clamping disk 28. The other clamping disk is bored to fit and arranged to slide on a threaded portion 38 of the stem and is put under clamping pressure by a nut 40 on the portion 38. Rotation of the disk 30 relatively to the shank 22 is prevented by a key 42 arranged to slide in a groove 44 (Fig. 2), while relative rotation of the disk 28 is prevented by a dowel 46 projecting from a concentric disk 48. The latter disk is fastened by screws 50 to a concentric disk 52 formed on or fixed to the stem 22. The construction just described is such that the shank 22 may be inserted axially through the clamping members 28 and 30, likewise through the sleeve 36, and when these parts are assembled the clamping members and the sleeve are centered by the circular cross-section of the shank. Furthermore, each of these parts is symmetrical and therefore a balanced unit.

An adjusting collar 54 is detachably fastened to the sleeve 36 by a key 56 and by a nut 58. This collar is provided with diametrically opposite fingers 60 arranged to extend through notches 62 formed in the side edges of the cutter blades. A worm gear 64 is formed on the right-hand end of the sleeve 36 and is engaged by a worm 66. The gear 64 and worm 66 are completely enclosed by the disks 48 and 52 in which complemental sockets are formed to receive them. The peripheral portions of the enclosing disks touch each other so that no dust can enter between them. The worm 66 is formed with smooth cylindric stem portions 68 which have bearings in the disks 48 and 52, one of said stem portions projecting far enough to be engaged by a tool such as a screw-driver or socket-wrench so that it may be turned to effect adjustment of the cutter blades. This construction does not impair the balance of the cutter-head, since the weight of the worm member is counteracted by the absence of metal taken out to form its socket.

Thin sheet metal plates 70 are fastened to the clamping disks 28 and 30 respectively and project toward each other and occupy lapped relation, as shown in Figs. 1 and 3. Each pair of lapped plates constitutes a dust guard to prevent the dust and chips from passing through the cutter-head between the blades. These guards are arranged in contiguous relation to the inner surfaces of the blades, and substantially all the dust and chips produced by the blades is held in the angles formed by the blades and the guards through a portion of a revolution of the cutter-head or until it is carried to a point at the rear where suction draws it into the dust-receiver 18. By forming each of the dust guards in two sections and arranging the latter to lap each other, the effective width of the dust guards is variable according to the width of the blades placed in the cutter-head.

The cutter blades are sharpened by grinding them on the outer side with the periphery of a grinding wheel to form the cutting edge 34 on the concave inner surface (see Fig. 4). This provides for sharpening the blades without detaching them from the cutter-head, whereas in former constructions having curved blades the latter have been so nearly concentric with respect to the cutter-head that it has been impossible to provide cutting surfaces on the inner surfaces and at the same time to provide the necessary clearance or "front rake", as it is called in metal-working parlance. In my present construction, however, the centers of curvature of the blades are so widely offset from the axis of the cutter-head that it is not only possible but advantageous to form the cutting edges on the inner surfaces of the blades by grinding the outer sides of the blades. The radius of curvature of the blades is substantially the same as the cutting radius so that the length of the blades before grinding is greater than formerly. As shown the centers of curvature of the blades are offset from the axis of the cutter-head an amount substantially equal to the radius of the cutter-head.

For purposes of comparison, Fig. 6 represents a well-known type of cutter-head having flat blades 72 ground on the outside, but cutter-heads of that type necessarily execute a scraping action rather than a true cutting action. In this figure radial line $a$ intersects the axis of rotation and is tangent to the cutting edge, line $b$ is projected from the inner surface or "cutting face" of the blade, while line $c$ is projected from the "front face" that is ground to sharpen the blade, and line $d$ is tangent to the circular path of travel of the cutting edge. To use certain other terms and expressions that are used to describe cutting tools in metal-working, the angle of $b\ c$ is the "tool angle" and the angle $c\ d$ is the "angle of clearance". In this case the angle $b\ d$, commonly called the angle of "top rake", is about sixty degrees, and since the direction of motion of the cutting edge is substantially at right angles to the radial line $a$ the tool lacks too much of the penetrative factor necessary to produce a true cutting action, and consequently the tool has a difficult and excessive scraping action. This scraping action not only turns the edge and dulls it rapidly but also subjects the blade to a relatively great component of lateral stress which too often breaks the blade and results in throwing out the broken parts, sometimes with injury to the operative.

A corresponding analysis is illustrated in Fig. 4 to show that a cutter-head and blades made in accordance with this invention have a substantially different action. In this figure the lines A, B, C and D correspond to the lines $a, b, c$ and $d$, respectively, in Fig. 6, but the angle B D is much less than the angle $b, d$ because of the cylindrical curvature of the blade 32 from its cutting edge to its trailing edge. As a result of sharpening the blades 32 by grinding their front faces 35 with the periphery of a grinding wheel, as disclosed in my aforesaid application Serial No. 22,144, each front face is concave in sections in planes perpendicular to the axis of the inner surface of the blade, irrespective of whether the cutting edge thus formed has an ogee profile, a straight profile or a profile of some other shape. Moreover, since, in the sections referred to, the cutting face as well as the front face is concaved, a very acute cutting edge may be formed without unduly weakening the blade. The tool-angle is represented by lines B and C, while the angle of clearance is represented by lines C and D. In this case the angle B D, or top rake, is not more than 45 degrees, and accordingly the penetrative or cutting factor is developed to a high degree while the scraping factor is correspondingly decreased. Furthermore, the cutting edge is not turned or dulled so rapidly as it would be in a construction corresponding to Fig. 6, and the component of lateral stress that tends to break the blades is so greatly reduced that virtually all danger of breakage is eliminated.

Although the blades 32 are straight in cross-section (see Fig. 5) their cutting edges 34 may be given any desired profile. For example, as shown, the edges have ogee curvatures and are adapted to trim Louis heels. Heretofore, all blades adapted to trim Louis heels have not only been ground on the inside, but they have been molded in cross-section to produce the ogee curve that is characteristic of Louis heels. In other words, the curvature of profile has been produced by special molding rather than by special grinding. Now, the cost of molded blades and the cost of sharpening them on the inside are much greater than the cost of blades made and sharpened according to this invention. Furthermore, it is practically impossible to make two molded blades of exactly the same cross-section, but the difficulty of making two that will cut exactly alike is eliminated by the present invention.

Although the rotary holder 14 shown in Fig. 1 is provided with the screw 26 for drawing the cutter-head against the right-hand end of the holder, the collar 52 is provided with a lug such as the dowel 74 (Fig. 3) which enters a socket or hole formed in a flange 76 affixed to or formed on the left-hand end of the holder. The dowel thus forms an interlocking connection between the cutter-head and the holder by which the cutter-head is positively driven without dependence upon the clamping pressure produced by tightening the screw 26. To detach the cutter-head from the trimming machine it is only necessary to unscrew the screw 26 from the stem 22. The stem may then be withdrawn from the holder, and the cutter-head, with the blades and all its other parts intact, as shown by Figs. 3 and 5, may be transferred to a grinding apparatus such as that disclosed in the co-pending application hereinbefore referred to. As shown therein, the shank or stem of the cutter-head may be utilized also to mount the cutter-head in a suitable holder of the grinding apparatus. Furthermore, the dowel 74 by which the cutter-head and the holder 14 of the trimming machine are positively interlocked may be utilized also in the grinding apparatus to register first one blade and then the other in the desired relation to the abrading wheel to insure sharpening the blades alike.

The cutter-head herewith illustrated and described is designed to insure uniformity of the two cutting edges when the blades are sharpened by the apparatus illustrated in the other said application provided the following method of procedure is followed. Assuming that the cutter-head is about to be detached from the trimming machine, the most convenient procedure would be to loosen the nut 40, before loosening the screw 26, to relieve the blades 32 from the clamping pressure so that they could be adjusted by turning the worm 66. Having turned the worm to advance the blades the desired distance, the nut 40 will be tightened to restore the clamping pressure to the blades. The screw 26 will then be unscrewed, the cutter-head will be detached from the holder 14 and the shank 22 will be mounted in a suitable holder with which the grinding apparatus is provided. The dowel 74 will register one of the blades relatively to the abrading wheel by which the first blade will be sharpened to reproduce in the cutting edge a profile determined by a form or templet with which the grinding apparatus is provided. Having sharpened the first blade, the cutter-head will be turned around its axis 180 degrees and the dowel 74 will be inserted in another notch or hole to register the other blade relatively to the abrading wheel. When the second blade has been sharpened the cutter-head is ready to be replaced in the trimming machine as hereinbefore described. It will be observed from the foregoing that the construction of the cutter-head provides for adjusting the blades before they are sharpened and that if the adjustment is not disturbed after the blades have been sharpened the two cutting edges, having been ground exactly to the same profile and at exactly the same distance from the axis of the cutter-head, will necessarily cut to the same depth and otherwise operate without any variation between the work done by one cutting edge and that done by the other.

Having described my invention, what I claim as new and desire to secure by Letters Patent of the United States is:

1. A rotary cutter-head comprising cooperative blade-clamping members, adjustable blades each having a notch in one side edge, means for securing said clamping members against relative rotation, and means arranged to engage said blades in said notches to adjust them relatively to said clamping members.

2. A rotary cutter-head comprising confronting blade-clamping members formed with grooves, adjustable blades the side edges of which are arranged in said grooves, one side edge of each blade having a notch, and blade-adjusting means arranged to function in said notches.

3. A rotary cutter-head comprising a shank, a sleeve arranged to turn on said shank, confronting blade-clamping members one of which is supported and centered by said sleeve which extends therethrough, adjustable blades arranged between and clamped by said members, means at the outer side of said one of said members for adjusting said sleeve rotatively, and means carried by said sleeve between said members for communicating such adjusting movement to each of said blades.

4. A rotary cutter-head comprising a shank, a sleeve arranged to turn on said shank, confronting blade-clamping members through one of which said sleeve extends, adjustable blades arranged between and clamped by said members, said sleeve having a gear at the outer side of said one of said members, a worm meshed with said gear to adjust said sleeve rotatively, and means carried by said sleeve between said clamping members to communicate such adjusting movement to each of said blades.

5. A rotary cutter-head comprising adjustable blades and means for clamping them, two co-operative members forming a dust-excluding socket, reducing gearing arranged in said socket, and adjustable member operably connected to said reducing gearing and extending through one of said socket-forming members to the outside thereof, and means carried by said adjustable member to communicate adjusting movement to each of said blades.

6. A rotary cutter-head comprising adjustable blades and means for clamping them, two disks arranged in confronting relation and having complemental depressions in their confronting faces forming a socket, a worm and gear arranged in said socket, the marginal portions of said disks abutting each other to exclude dust from said socket but having an opening in line with said worm to afford access to the latter for purposes of adjustment, said gear having a concentric portion extending axially through one of said disks, and means carried by said portion for communicating adjusting movement to said blades.

7. A rotary cutter-head comprising a shank, a relatively rotatable sleeve arranged on said shank, co-operative clamping members one of which is arranged on said shank and the other supported and centered by said sleeve, blades arranged between and clamped by said members, means for adjusting said sleeve rotatively, and means for communicating such adjusting movement from said sleeve to said blades.

8. A rotary cutter-head comprising relatively adjustable confronting clamping members, blades arranged between and clamped by said members, and dust-guards each comprising relatively adjustable co-operative sections fastened to said clamping members respectively and arranged to lap one another between said clamping members.

9. A heel-trimming machine comprising a rotary cutter-head, and a suction operated dust-remover adjacent thereto, said cutter-head having relatively adjustable clamping members for carrying detachable trimming blades of various widths, and dust-guards each comprising relatively adjustable co-operative sections fastened to said clamping members respectively and arranged to lap one another between said clamping members to prevent the dust and chips from escaping the influence of said dust-remover by passing through the cutter-head.

10. A rotary cutter-head comprising detachable blades, confronting clamping members between which and by which said blades are held, and dust-guards extending from one of said clamping members to the other in contiguous relation to the inner surfaces of said blades to prevent the dust and chips from passing through the cutter-head.

11. A rotary cutter-head comprising blades formed and arranged to be sharpened while held therein, a cylindric shank formed and arranged to enter a cylindric socket in a holder, and a lug arranged to enter a corresponding socket in such holder to maintain the cutter-head positively in a predetermined angular relation to the holder.

12. A cylindrical cutting blade having a cutting edge extending in the general direction of the axis of the inner and outer surfaces of the blade, and having a front face concave in sections in planes perpendicular to said axis and forming said cutting edge by intersection with said inner surface.

13. In a heel-trimming machine, a rotary cutter-head having adjustable blades each curved lengthwise but straight in cross-section, each of said blades having a cutting edge of ogee curvature formed on the inner surface by a concave surface extending back from said edge to the outer surface of the blade.

14. A rotary cutter-head comprising a shank, two cooperative clamping disks having bores through which said shank may be inserted axially and having eccentric grooves, a curved knife blade two opposite edges of which are arranged in said grooves, and means carried by said shank for applying clamping pressure to said disks lengthwise of said shank, said blade having a cutting edge at its inner surface adapted to be sharpened by abrading its outer surface.

15. A rotary cutter-head comprising a shank, two cooperative symmetrically formed clamping disks each having a central hole through which said shank may be inserted axially and each having a plurality of eccentric curved grooves, a plurality of correspondingly curved knife blades arranged between said clamping disks with their side edges in said grooves, and means carried by said shank for applying clamping pressure to said disks lengthwise of said shank, each of said blades having a cutting edge at its inner surface adapted to be sharpened by abrading its outer surface.

16. A rotary cutter-head comprising a shank having a portion of circular cross-section, two cooperative clamping disks each having a circular hole through which said portion of the shank extends and by which it is centered relatively to said shank, a plurality of longitudinally curved knife blades arranged between said disks, the latter having eccentric curved grooves in which the curved side edges of the blades are arranged, and means carried by said shank for applying clamping pressure to said disks lengthwise of said shank, each of said blades having a cutting edge at its inner surface adapted to be sharpened by abrading its outer surface.

In testimony whereof I have signed my name to this specification.

ALFRED B. FOWLER.